United States Patent [19]

Marcuse et al.

[11] 4,124,728
[45] Nov. 7, 1978

[54] METHOD FOR MONITORING THE CONCENTRICITY OF PLASTIC COATINGS ON OPTICAL FIBERS

[75] Inventors: Dietrich Marcuse, Lincroft; Herman M. Presby, Highland Park, both of N.J.

[73] Assignee: Bell Telephone Laboratories, Incorporated, Murray Hill, N.J.

[21] Appl. No.: 764,387

[22] Filed: Jan. 31, 1977

[51] Int. Cl.$^2$ .................. G01B 9/02; G01N 21/30
[52] U.S. Cl. ........................................ 427/8; 356/73.1; 427/10; 356/429
[58] Field of Search .............. 356/199, 200, 107, 108, 356/109, 111; 427/8, 10; 65/3 A, 29

[56] References Cited

U.S. PATENT DOCUMENTS 4,042,723  8/1977  Presby ........................... 356/109 X Primary Examiner—Vincent P. McGraw
Assistant Examiner—Rodney B. Bovernick
Attorney, Agent, or Firm—Stephen M. Gurey

[57] ABSTRACT

The concentricity or eccentricity of a plastic coating on an optical fiber is determined by monitoring the absence or presence, respectively, of a particular intensity peak in the backscattered light pattern generated by a light beam incident upon the fiber as the fiber is drawn, coated and pulled through the light beam. The particular intensity peak monitored results from the rays of minimum deviation which traverse the optical fiber only once as the incident rays are refracted and reflected through the coated fiber to form the backscattered light pattern. The position of the coating applicator is automatically adjusted if this intensity peak is electronically detected.

8 Claims, 8 Drawing Figures

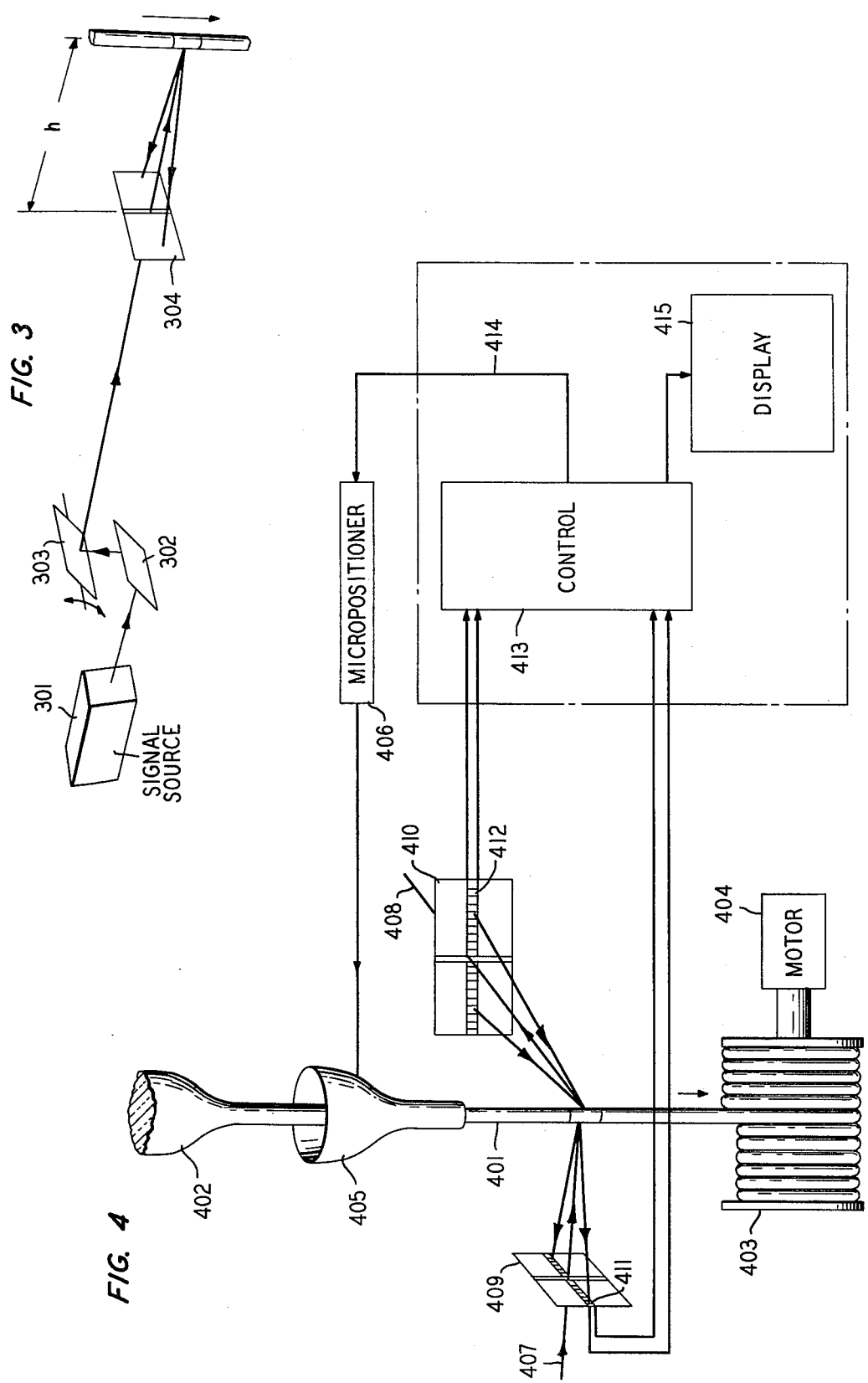

METHOD FOR MONITORING THE CONCENTRICITY OF PLASTIC COATINGS ON OPTICAL FIBERS

BACKGROUND OF THE INVENTION

This invention relates to optical fibers and, more particularly, to a method for optically monitoring the concentricity of plastic coatings as they are applied to optical fibers.

Plastic coatings that are applied to optical fibers serve multiple purposes. They serve to reduce microbending loss, maintain the pristine strength of the fibers and provide for abrasion and mechanical protection of the fibers during cable manufacturing processes. In addition, the plastic coated fiber may decrease cross-talk between optical fibers and improve the long term stability of optical fibers in an uncontrolled environment. The plastic coating can also serve as the cladding for fused silica cores since the refractive index of many polymer materials is less than that of fused silica.

For optimum performance, the coating must be applied concentrically around the fiber. This is necessary for routine handling and splicing of the fibers as well as for optimum strength and transmission characteristics.

The coatings which include such materials as silicon, epoxy-acrylates, tetrafluoroethylene, perfluoro-vinyl-methyl ether, perfluoronated-ethylene-propylene, and ethylene-vinyl-acetate copolymer, are applied to fibers by various methods. Prior art techniques for examining the concentricity of coatings once they are produced require the microscopic examination of the fiber after a run has been processed which is time-consuming and destructive. More importantly, real time information to enable the fabricator to make corrections, evaluate various applicators or stop the process completely is not available as the coating is being applied.

In the copending patent application of Mr. H. M. Presby, Ser. No. 685,527, filed May 12, 1976, and assigned to the present assignee, and which issued on Aug. 16, 1977 as U.S. Pat. No. 4,042,723, the concentricity of a plastic coating as it is applied to an optical fiber is determined by comparing the locations of intensity peaks in the backscattered light patterns generated in response to two orthogonal light beams. The present invention is an alternate and improved method for determining concentricity.

SUMMARY OF THE INVENTION

An object of the present invention is to monitor the concentricity of plastic coatings as they are applied to optical fibers.

In accordance with the present invention, the concentricity or eccentricity of a substantially transparent plastic coating which has been applied to an optical fiber is determined by monitoring the absence or presence, respectively, of a particular intensity peak in the backscattered light pattern generated in response to a light beam incident upon the fiber. The particular intensity peak monitored results from the rays of minimum deviation which traverse the optical fiber only once as the incident rays are refracted and reflected through the coated fiber to form the backscattered light pattern.

In a particular embodiment of the present invention, the concentricity of a plastic coating is maintained in an on-line coating application process. The backscattered light pattern generated when an optical fiber is coated and pulled through an incident light beam is electronically monitored. When the aforedescribed intensity peak is detected, the position of the coating applicator is automatically adjusted until the intensity peak disappears.

BRIEF DESCRIPTION OF THE DRAWINGS

FIG. 3 shows apparatus for monitoring the concentricity of a plastic coated fiber in accordance with the present invention; and FIG. 4 shows apparatus which automatically controls the coating application process by employing the monitoring technique of the present invention.

DETAILED DESCRIPTION

Figure 1A:
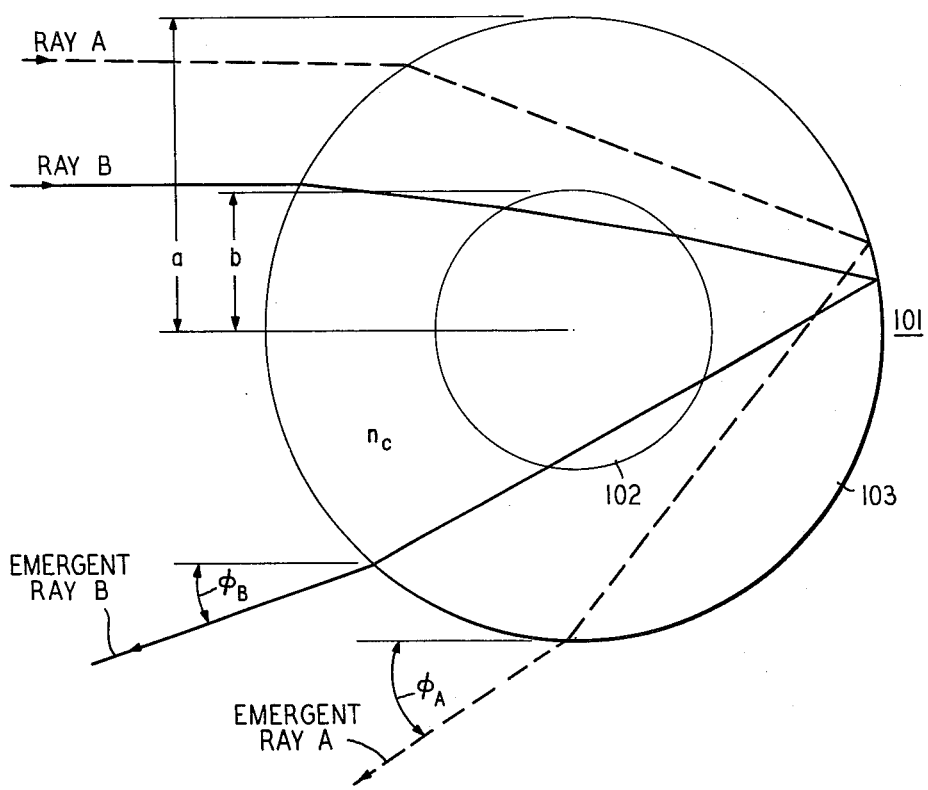
FIG. 1A is a cross-sectional view of an optical fiber having a plastic coating concentrically disposed thereon and which illustrates a beam of light incident thereon.

With reference to FIG. 1A, a beam of light is shown incident upon a cross-sectional area of a plastic coated optical fiber 101 having an exterior radius $a$. The optical fiber 102 has a radius $b$ and possesses a core which has either a uniform index of refraction or a graded index. A plastic coating 103 concentrically surrounding the fiber can act as both the fiber cladding and as a protective sheath or, for fibers already clad, as just a protective sheath. In the former case, it has an index of refraction less than the minimum index of refraction of the fiber 102. The incident light beam comprises parallel rays such as illustrated Ray A, which are refracted at the air-coating interface, traverse the coating, and are then reflected at the coating-air interface. The reflected rays traverse the coating again and exit the coating into the air. The angle of minimum deviation $\phi_A$ that emergent Ray A makes with its incident direction is given by:

$$\phi_A = 4 \arcsin\left[\frac{2}{n_c\sqrt{3}}\left(1 - \frac{n_c^2}{4}\right)^{\frac{1}{2}}\right] - 2\arcsin\left[\frac{2}{\sqrt{3}}\left(1 - \frac{n_c^2}{4}\right)^{\frac{1}{2}}\right] \quad (1)$$

where $n_c$ is the refractive index of the plastic coating 103. The incident light beam also includes rays such as illustrated Ray B, which are refracted at the air-coating interface, traverse the coating, and are refracted at the coating-fiber interface. These rays traverse the fiber, are refracted at the fiber-coating interface and continue through the coating again. They are reflected at the coating-air interface, traverse the coating and re-enter the fiber. After traversing the fiber they pass through the coating again and emerge from the coating into the air. A geometric-optical analysis of the rays readily shows the angles of minimum deviations $\phi_B$ of these emergent rays to be a function of several angles and of the indices of refraction of the coating and the fiber. Such an analysis is presented in "Refractive Index and Diameter Determination of Step Index Optical Fibers and Preforms" by H. M. Presby and D. Marcuse, *Applied Optics*, Vol. 13, No. 12, December 1974, pp 2882–2885.

Figure 1B:
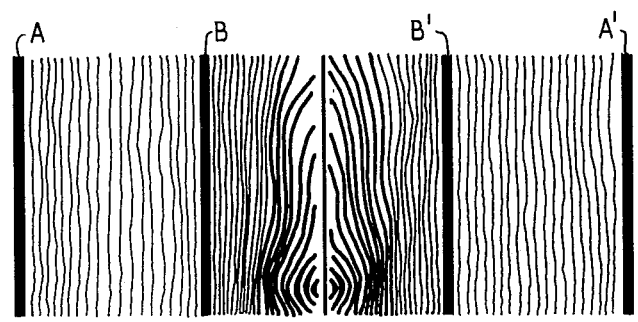
FIG. 1B shows the backscattered light pattern generated by the light beam incident upon the coated fiber in FIG. 1A.

The parallel rays incident upon the coated fiber which traverse only the plastic coating, such as Ray A, or which traverse both the coating and the fiber, such as Ray B, create a backscattered light pattern which can be observed on an opaque viewing screen perpendicular to the incident beam. Although not shown in FIG. 1A, the incident beam includes rays which are symmetric to Rays A and B with respect to the fiber axis. The rays of minimum deviations of these incident rays contribute to the backscattered light pattern. FIG. 1B shows the backscattered light pattern generated in response to a laser beam incident upon the concentrically coated optical fiber of FIG. 1A. As can be noted, the backscattered light pattern includes a pair of intensity peaks A and A', and a pair of intensity peaks B and B', produced by the rays of minimum deviations of the Rays A and B and their symmetric rays. As described in the aforenoted copending patent application, the concentricity of the plastic coating surrounding the optical fiber is determined by comparing, in the backscattered light patterns produced by two incident beams, the spatial positions of the intensity peaks due to the rays of minimum deviation of the angles $\phi_A$ and $\phi_B$. Any changes in the spatial position of these intensity peaks is indicative of a lack of concentricity of the plastic coating around the fiber.

Figure 2A:
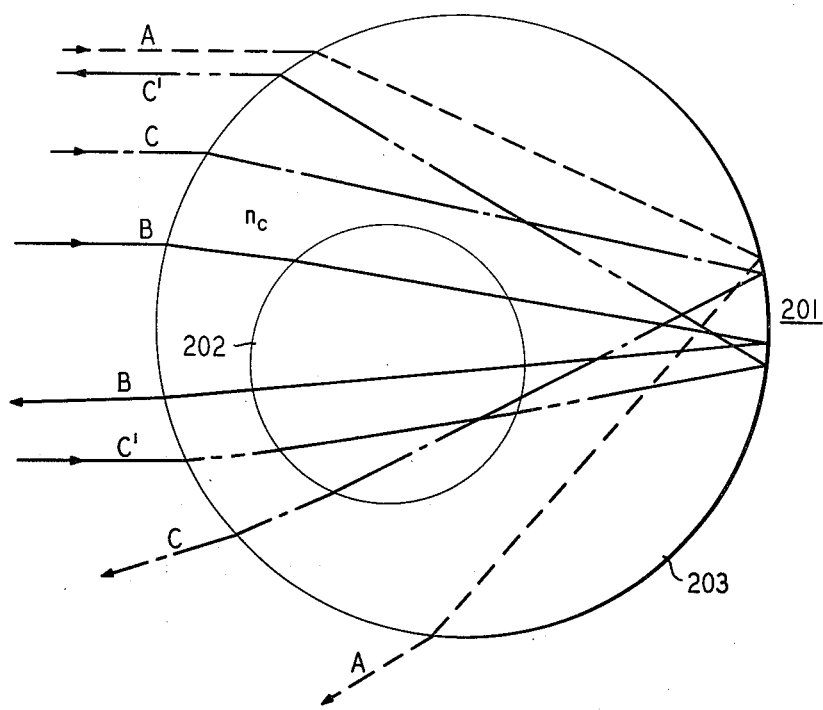
FIG. 2A is a cross-sectional view of an optical fiber having a plastic coating nonconcentrically disposed thereon and which illustrates a beam of light incident thereon.

In accordance with the present invention, the concentricity of a plastic coating on an optical fiber is monitored by noting the absence or presence of an additional intensity peak in the backscattered light pattern generated in response to an incident light beam perpendicular to the axis of the fiber. An additional ray of minimum deviation has been found to exist in only those fibers in which the optical fiber core is eccentrically disposed within its protective plastic coating. With reference to FIG. 2A, a beam of light is shown incident upon a cross-sectional area of an eccentrically coated optical fiber 201 having an exterior radius $a$, as does the fiber in FIG. 1A. Also, as with the fiber in FIG. 1A, the optical fiber 202 has a radius $b$ and possesses a core which has a uniform index of refraction or a graded index. A plastic coating 203 is eccentrically disposed around the optical fiber core 202. The incident light beam includes parallel rays, such as Ray A, which pass only through the plastic coating, and parallel rays, such as Ray B, which traverse the optical fiber 202 twice. These rays were discussed hereinabove in connection with FIG. 1A. As heretofore noted, an additional type of ray exists only when the optical fiber 202 is eccentrically disposed within plastic coating 203. This ray (illustrated as Ray C) is refracted at the air-coating interface, traverses the coating and is reflected at the coating-air interface. The reflected ray traverses the coating again and is refracted at the coating-fiber interface. The ray continues through the fiber and emerges into the coating again before emerging from the coating into the air. Ray C thus makes only one traversal through the optical fiber 202 unlike Ray B, which traverses the optical fiber 202 twice, or Ray A which does not traverse the optical fiber. An angle of minimum deviation which can be determined by a geometric-optical analysis thus exists for rays having paths like the path of illustrated Ray C. These rays cause an additional intensity peak in the backscattered light pattern. A Ray C' which passes through the fiber 202 before being reflected at the coating-air interface, but which does not pass through the fiber 202 after being reflected, is similar to Ray C in that it only makes one traversal through the fiber. Accordingly, an additional intensity peak exists in the backscattered light pattern from the rays of minimum deviation having a trajectory similar to that of illustrated Ray C'.

Figure 2B:
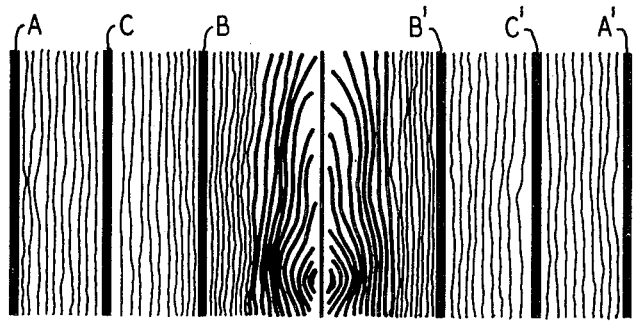
FIG. 2B shows the backscattered light pattern generated by the light beam incident upon the coated fiber in FIG. 2A.

FIG. 2B shows the backscattered light pattern produced when a laser beam is incident on the eccentrically coated optical fiber as shown in FIG. 2A. As can be noted, the backscattered light pattern includes two pairs of intensity peaks, A and A' and B and B', resulting from the rays of minimum deviation of rays of type A and B, respectively. In addition, an intensity peak C exists between peaks A and B and an intensity peak C' exists between peaks A' and B'. Peaks C and C' result from the rays of minimum deviation of rays of the type C and C' discussed above. This third pair of intensity peaks exists only when the optical fiber is eccentrically disposed within its plastic protective coating. Accordingly, by observing the backscattered light pattern for the absence or presence of one or both of these intensity peaks as a fiber is pulled through an incident beam, the concentricity or eccentricity, respectively, of the plastic coating can be determined.

FIG. 3 shows an arrangement for observing the backscattered light pattern produced in response to a light beam incident on a substantially transparent plastic coated optical fiber. A signal source 301, such as a CW He-Ne laser, generates a narrowband light beam which is incident on a mirror 302. The light beam is reflected onto an oscillating mirror 303 which oscillates back and forth to transform the circular beam into a line of light energy. The line of light energy passes through a slit in an opaque observation screen 304 and impinges directly upon a portion of the optical fiber under observation at an angle perpendicular to the axis of the fiber. Observation screen 304 is perpendicularly disposed in the path of light at a distance $h$ from the fiber. The incident beam is refracted through the substantially transparent plastic coating and the interior optical fiber and is reflected at the coating-air interface to form a backscattered light pattern which can be monitored on observation screen 304. The concentricity or eccentricity of the coating on the fiber section upon which the incident beam impinges is determined by noting the absence or presence, respectively, of an intensity peak between either central outermost intensity peak (A or A') and that peak's nearest most central intensity peak (B or B') in the backscattered light pattern on observation screen 304. Therefore, by monitoring the observation screen as the fiber is pulled through the incident light beam, the concentricity of the plastic coating along the fiber length is determined. As will be described in detail hereinafter, the aforedescribed monitoring procedure can be combined with the coating application process to automatically maintain fiber-coating concentricity.

There may be some angles of orientation of the coated fiber with respect to the incident beam which may not produce the additional intensity peaks in the backscattered light pattern even though the fiber is eccentrically disposed within the coating. In order to eliminate a misinterpretation of the backscattered light pattern, additional reliability can be achieved by using a sweeping beam of incident light which changes the angle of incidence continuously as the fiber travels therethrough. Alternatively, the fiber can be mechanically rotated back and forth as it passes through the observation region. Sufficient reliability can be achieved, however, when the backscattered light patterns generated from two mutually perpendicular directions are monitored. Observation of an additional intensity peak in either backscattered light pattern is indicative of a lack of concentricity.

Figure 1C:
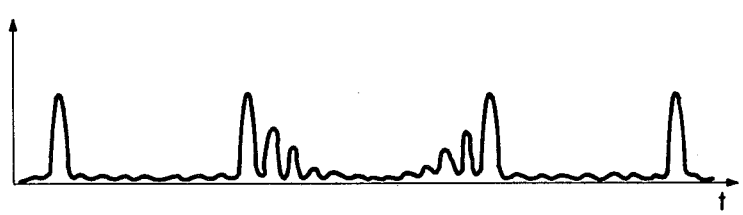
FIG. 1C shows an electrical signal generated from the backscattered light pattern in FIG. 1B.
Figure 2C:
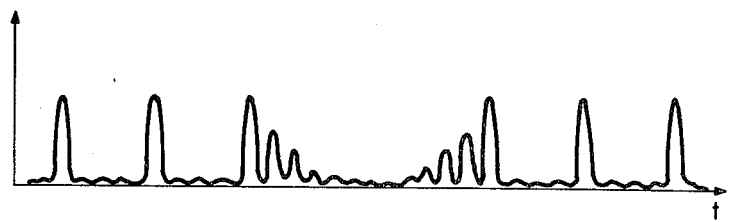
FIG. 2C shows the electrical signal generated from the backscattered light pattern in FIG. 2B.

FIG. 4 illustrates a system which automatically controls the fiber coating application process by electrically monitoring backscattered light patterns produced from two orthogonal light beams. As the optical fiber 401 is drawn from a preform 402 onto a rotating drum 403, the latter being controlled by a motor 404, an applicator 405 which surrounds the fiber as it is being drawn, applies a plastic coating around the fiber. The position of applicator 405 around the fiber 401 is controlled by a micropositioner 406 and, as described immediately hereinbelow, micropositioner 406 is responsive to an electrical signal which is derived by electrically monitoring the backscattered light patterns generated in response to the two orthogonal laser light beams 407 and 408 incident upon the coated fiber. Light beam 407 passes through a slit in observation screen 409 and light beam 408 passes through a slit in observation screen 410 so that each beam impinges upon a section of the fiber 401 as it is pulled onto drum 403. As was described in detail, each incident beam is refracted and reflected by the plastic coated fiber to produce backscattered light patterns on observation screens 409 and 410. A scanning diode matrix 411 is disposed on observation screen 409 and a scanning diode matrix 412 is disposed on observation screen 410. Scanning diode matrices 411 and 412 may be any one of a plurality of commercially available diode matrices, such as a Reticon Corporation Line Scan Array. Each diode matrix converts the backscattered light pattern incident thereon into an electrical signal having maximas and minimas related to the light intensity maximas and minimas in the backscattered light pattern. FIG. 1C illustrates the electrical signal generated from the backscattered pattern of FIG. 1B and FIG. 2C illustrates the electrical signal generated from the backscattered pattern of FIG. 2B. As can be noted, the signal in FIG. 2C has an extra pair of maxima due to the additional intensity peaks C and C'. Diode matrices 411 and 412 are connected to a control unit 413, such as Reticon RS 660 Programmable Control Unit designed for interaction with the Reticon scanning diode matrices. Control unit 413 can be readily programmed to detect the presence or absence of an additional intensity peak between a set of peaks A and B or A' and B' in either backscattered pattern. Control unit 413 generates a signal on lead 414 to control micropositioner 406. When control unit 413 detects an additional intensity peak, the signal on lead 414 is varied and micropositioner 406 repositions applicator 405 to correct for the misalignment between the applicator 405 and the fiber 401 being coated. Micropositioner 406 is continually adjusted until the additional intensity peaks disappear from the backscattered patterns. Control unit 413 is also connected to a display unit, such as a dual beam oscilloscope to give an operator monitoring the application process a visual indication of the electrical signal derived from each backscattered light pattern.

Various modifications of this invention can be made without departing from the spirit and scope of the invention. For example, a quasi-monochromatic light source such as a light-emitting diode can be used in place of the monochromatic laser beam in the embodiment described hereinabove. Vidicon scanning techniques can also be used to monitor the backscattered light patterns. Furthermore, although described in connection with the monitoring of the properties of a plastic coating on an optical fiber, the present invention can be used to monitor the properties of any substantially transparent coating on any relatively transparent dielectric rod. The above-described arrangement is illustrative of the application and principles of the invention. Other embodiments may be devised by those skilled in the art without departing from the spirit and scope of the invention.

What is claimed is:

1. A method for monitoring the concentricity of a coating on an optical fiber, said coating being substantially transparent, comprising the steps of:
    illuminating said coated fiber with a beam of light from a narrowband source;
    observing the backscattered light pattern generated by said beam of light; and
    determining the concentricity or eccentricity of said coating on said optical fiber from the absence or presence, respectively, of at least one predetermined intensity peak located between the central outermost and the central innermost peaks in the backscattered light pattern, said predetermined intensity peak resulting from the rays of minimum deviation in said beam of light which traverses the optical fiber only once.

2. The method according to claim 1 wherein said narrowband source is a CW laser.

3. A method for controlling an applicator which applies a coating onto an optical fiber, said coating being substantially transparent, comprising the steps of:
    illuminating the fiber onto which the coating has been applied with a beam of light from a narrowband source perpendicular to the axis of said fiber;
    observing the backscattered light pattern generated by said beam of light;
    determining the concentricity or eccentricity of said coating on said optical fiber from the absence or presence, respectively, of at least one predetermined intensity peak located between the central outermost and central innermost peaks in the backscattered light pattern, said predetermined intensity peak resulting from the rays of minimum deviation which traverse the optical fiber only once; and
    adjusting the position of said applicator until the absence of said predetermined intensity peak is observed in the backscattered light pattern.

4. The method according to claim 3 wherein said narrowband source is a CW laser.

5. A method for controlling an applicator which applies a coating onto an optical fiber, said coating being substantially transparent, comprising the steps of:
    illuminating the fiber onto which the coating has been applied with a beam of light from a narrowband source perpendicular to the axis of said fiber;
    converting the backscattered light pattern generated in response to said beam of light into an electrical signal whose intensity variations, as a function of time, correspond to the spatial light intensity variations in said backscattered light pattern;

determining the absence or presence of a predetermined intensity maxima in said electrical signal, said predetermined intensity maxima located between the central outermost and central innermost maximas in said electrical signal, said predetermined intensity maxima resulting from an intensity peak in said backscattered light pattern which results from the rays of minimum deviation which traverse the optical fiber only once; and adjusting the position of said applicator until said predetermined intensity maxima in said electrical signal is not present.

6. The method according to claim 5 wherein said narrowband source is a CW laser.

7. A method for controlling an applicator which applies a coating onto an optical fiber, said coating being substantially transparent, comprising the steps of:

illuminating the fiber onto which the coating has been applied with a beam of light incident to a cross-sectional axis of said fiber at a first angle;

illuminating the coated fiber with a beam of light incident at a second angle;

converting the first backscattered light pattern generated in response to said beam of light incident to said fiber at said first angle into a first electrical signal whose intensity variations, as a function of time, correspond to the spatial light intensity variations in said first backscattered light pattern;

converting the second backscattered light pattern generated in response to said beam of light incident to said fiber at said second angle into a second electrical signal whose intensity variations, as a function of time, correspond to the spatial light intensity variations in said second backscattered light pattern;

determining the absence or presence of a first predetermined intensity maxima in said first electrical signal, said first predetermined intensity maxima located between the central outermost and central innermost maximas in said first electrical signal, said first predetermined intensity maxima resulting from an intensity peak in said first backscattered light pattern which results from the rays of minimum deviation which traverse the optical fiber only once in said beam incident at said first angle;

determining the absence or presence of a second predetermined intensity maxima in said second electrical signal, said second predetermined intensity maxima located between the central outermost and central innermost maximas in said second electrical signal, said second predetermined intensity maxima resulting from an intensity peak in said second backscattered light pattern which results from the rays of minimum deviation which traverse the optical fiber only once in said beam incident at said second angle; and adjusting the position of said applicator until said first predetermined intensity maxima in said first electrical signal is not present and said second predetermined intensity peak in said second electrical signal is not present.

8. The method according to claim 7 wherein the difference between said first angle and said second angle is 90°.

* * * * *